(12) United States Patent
Liao et al.

(10) Patent No.: US 7,913,848 B2
(45) Date of Patent: Mar. 29, 2011

(54) AIR FILLING BAG WITH OUTER FILM STRENGTHENING STRUCTURE

(75) Inventors: Chieh Hua Liao, Sindian (TW); Yaw Shin Liao, Sindian (TW); Yao Chuan Liao, Sindian (TW)

(73) Assignee: Chieh Hua Liao, Taipei County (TW)

( * ) Notice: Subject to any disclaimer, the term of this patent is extended or adjusted under 35 U.S.C. 154(b) by 17 days.

(21) Appl. No.: 12/211,257

(22) Filed: Sep. 16, 2008

(65) Prior Publication Data

US 2009/0196531 A1    Aug. 6, 2009

(30) Foreign Application Priority Data

Feb. 5, 2008  (TW) ............................... 97104560 A

(51) Int. Cl.
  *B65D 81/03*  (2006.01)
  *B65D 30/00*  (2006.01)
(52) U.S. Cl. .......................................... 206/522; 383/3
(58) Field of Classification Search ................. 206/522; 383/3, 43–44, 53
See application file for complete search history.

(56) References Cited

U.S. PATENT DOCUMENTS

| | | | | |
|---|---|---|---|---|
| 3,137,438 A | * | 6/1964 | Milton | ............................. 383/44 |
| 4,465,188 A | * | 8/1984 | Soroka et al. | .................. 206/522 |
| 5,178,281 A | * | 1/1993 | Enzu | .............................. 206/522 |
| 5,447,235 A | * | 9/1995 | Pharo | ............................. 206/522 |
| 5,772,034 A | * | 6/1998 | Lin | ................................ 206/522 |
| 5,857,571 A | * | 1/1999 | Tschantz et al. | .............. 206/522 |
| 6,283,296 B1 | * | 9/2001 | Newman | ....................... 206/522 |
| 7,165,677 B2 | * | 1/2007 | Tanaka et al. | ................. 206/522 |
| 7,665,609 B2 | * | 2/2010 | Liao et al. | ...................... 206/522 |

* cited by examiner

*Primary Examiner* — Bryon P Gehman
(74) *Attorney, Agent, or Firm* — Rabin & Berdo, P.C.

(57) ABSTRACT

An air filling bag with an outer film strengthening structure includes two outer films and a main check valve, where the two outer films are adhered to each other to form an air chamber by means of hot sealing, in which each outer film includes the first film sheet and the second film sheet stacked together, and a plurality of first hot sealing lines is formed by adhering the first film sheet to the second film sheet by means of hot sealing in a first direction together with a plurality of second hot sealing lines formed by adhering the first film sheet to the second film sheet by means of hot sealing in a second direction. The main check valve is positioned between the two outer films and one end thereof projects from the air chamber. Air in the air chamber can compress the main check valve to shield a first air passageway of the main check valve so as to prevent air from leaking out of the air chamber after outside air flows in the air chamber via the first air passageway.

10 Claims, 11 Drawing Sheets

AIR FILLING BAG WITH OUTER FILM STRENGTHENING STRUCTURE

CROSS-REFERENCES TO RELATED APPLICATIONS

This non-provisional application claims priority under 35 U.S.C. §119(a) on Patent Application No(s). 97104560 filed in Taiwan, R.O.C. on Feb. 5, 2008, the entire contents of which are hereby incorporated by reference.

FIELD OF THE INVENTION

The present invention relates to an air filling bag, and more particularly to an air filling bag with an outer film strengthening structure.

BACKGROUND

When large-scale articles are placed into a container for transportation, cushioning air bags will be placed in among the articles so as to protect the articles from impact during transportation, to avoid scratches and damage and increase efficiency during transport.

However, the volume of such cushioning air bags is always so large (in order to provide a better cushioning effect), that a lot of time needs to be spent to fill the bag with air; it wastes both time and labor. If a cushioning air bag is filled with a high pressure gas, the cushioning air bag's check valve is easily broken, and releases the gas; alternatively the outer film of the cushioning air bag is broken and the air leaks out. Moreover, such a cushioning bag is always scratched and damaged by a sharp or acute angle of the article in the container, causing air in the cushioning air bag to leak and lose the cushioning protection. Typically this will not be discovered until the article is removed from the container, and meanwhile the article is scratched or damaged because it lacks a cushioning medium during transport.

SUMMARY OF THE INVENTION

The present invention is proposed to improve the structure of a cushioning air bag, solving the problem that the cushioning air bag is easily scratched and damaged by a sharp or acute angle of an article in a container, causing air to leak and losing the cushioning protection, and further raising the air filling speed to reduce the time required to fill the cushioning air bag with air by improving the structure of the cushioning air bag and its check valve.

The present invention proposes an air filling bag with an outer film strengthening structure, including:
two outer films, forming at least one air chamber by means of hot sealing, each outer film including a first film sheet and a second film sheet stacked with the first film sheet; a plurality of first hot sealing lines, formed by adhering the first film sheet to the second film sheet by means of hot sealing in a first direction; and a plurality of second hot sealing lines, formed by adhering the first film sheet to the second film sheet by means of hot sealing in a second direction, the second direction being approximately perpendicular to the first direction; and
a main check valve, positioned between the two outer films, one end thereof projecting out of the air chamber, the main check valve including a first air passageway, used for connecting the air chamber with the outside, air in the air chamber compressing the main check valve to shield the first air passageway after air from outside flows into the air chamber via the first air passageway.

An air filling bag with an outer film strengthening structure according to the present invention uses first and second films which are independent and not glued to each other, to form an outer film and to strengthen the outer film; air in an air chamber will not leak and article still can be cushioned effectively even if the first film sheet or the second film sheet is broken.

In addition, a main check valve of the present invention is formed by stacking two first inner films and two second inner films together, where the two second inner films are stacked between the two first inner films such that high pressure air can be forced into the air chamber to allow the air chamber to be expanded with air, and high pressure during the air filling will not cause the check valve to be broken, thus achieving a reliable air tight seal.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
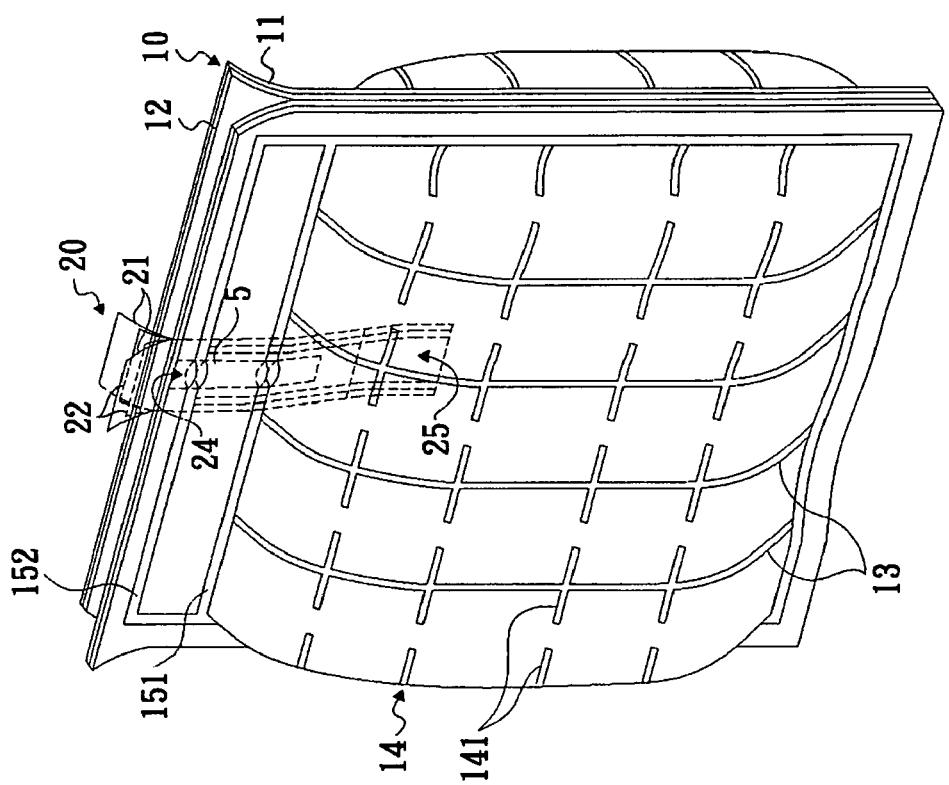
FIG. 1 is a perspective view, showing an outer film of a bendable multistage cushioning cover bag of a first embodiment according to the present invention.
Figure 2:
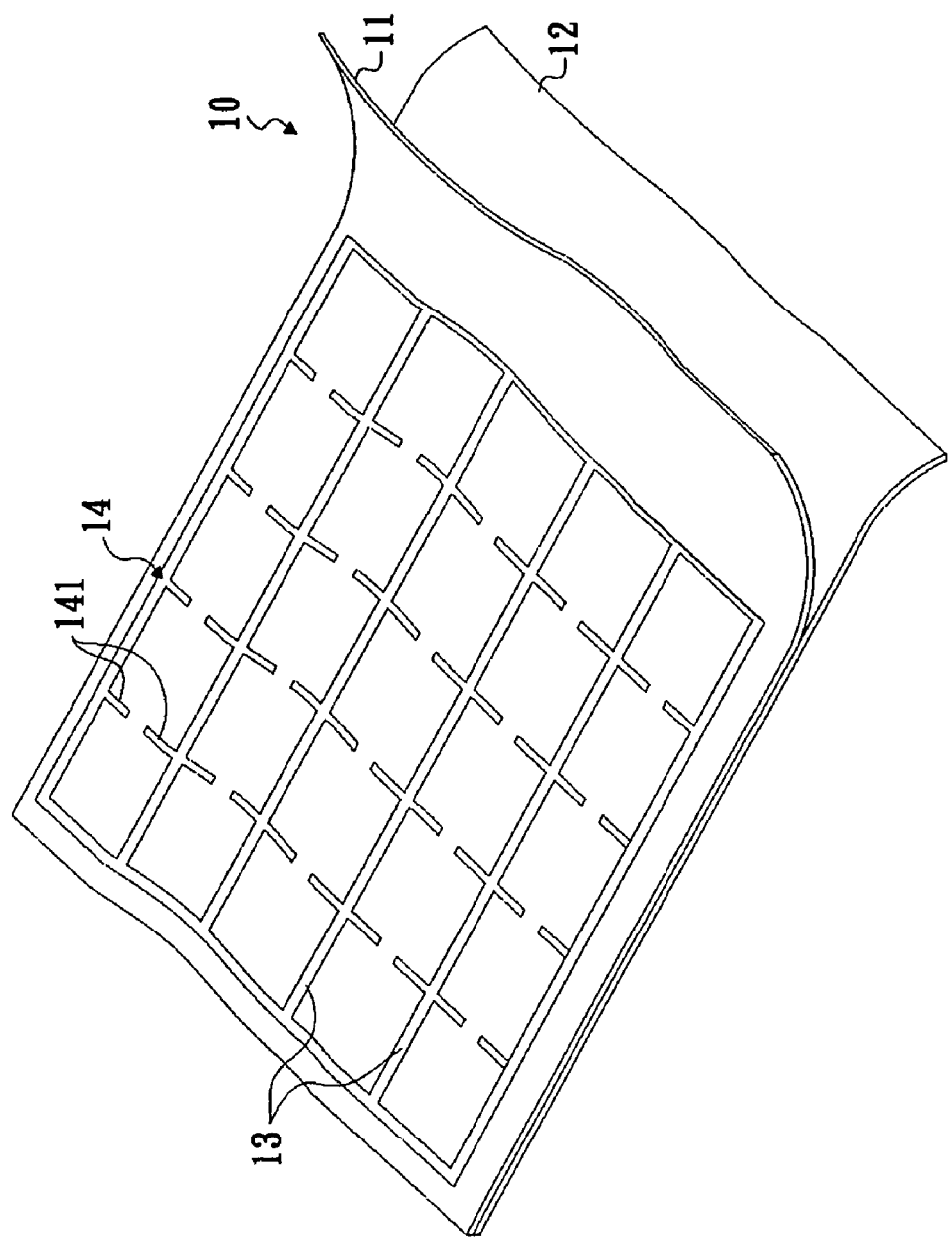
FIG. 2 is a schematic view, showing the structure of an outer film of a bendable multistage cushioning cover bag of the first embodiment according to the present invention.
Figure 3A:
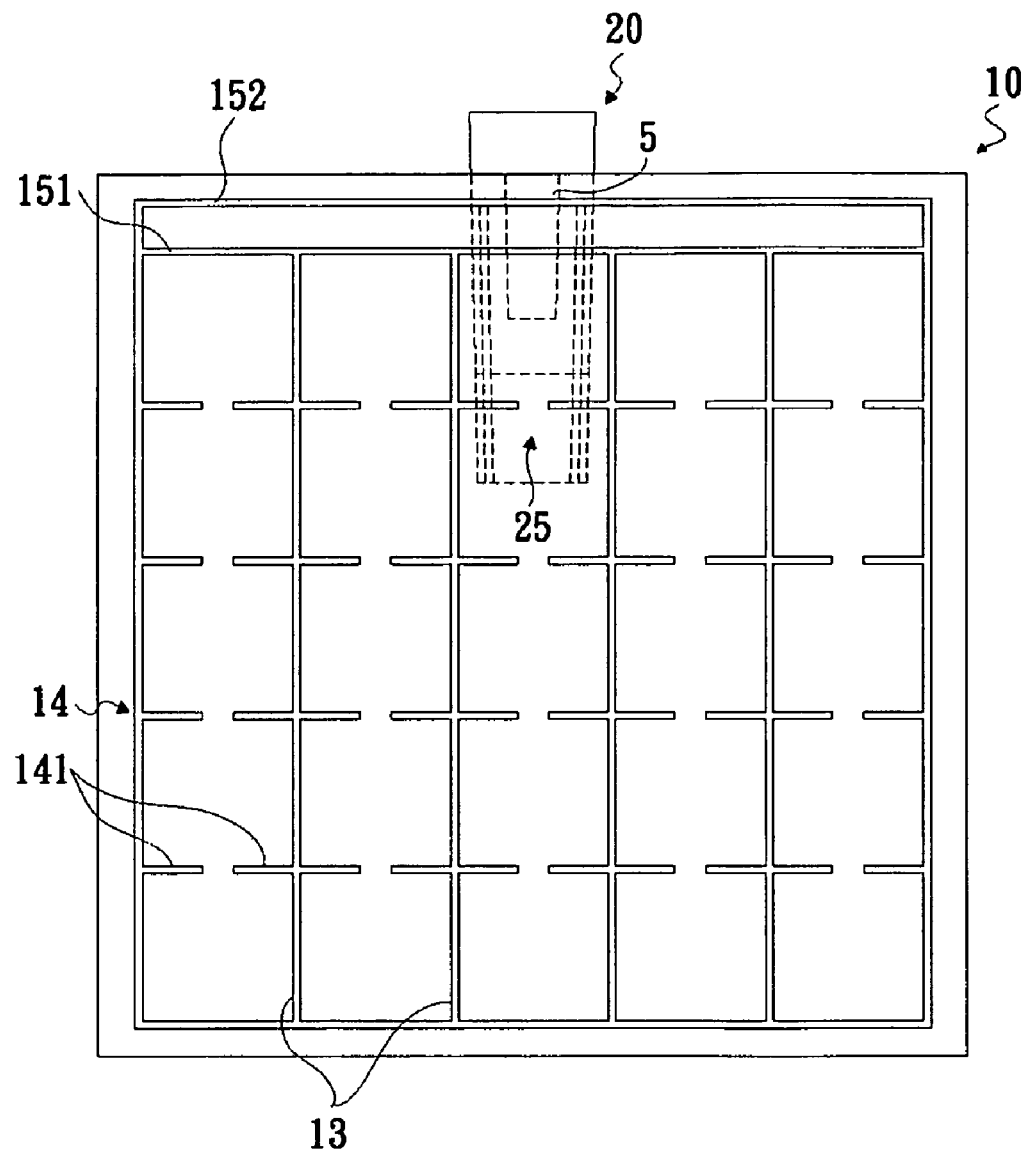
FIG. 3A is a plane view, showing a bendable multistage cushioning cover bag of the first embodiment according to the present invention.
Figure 3B:
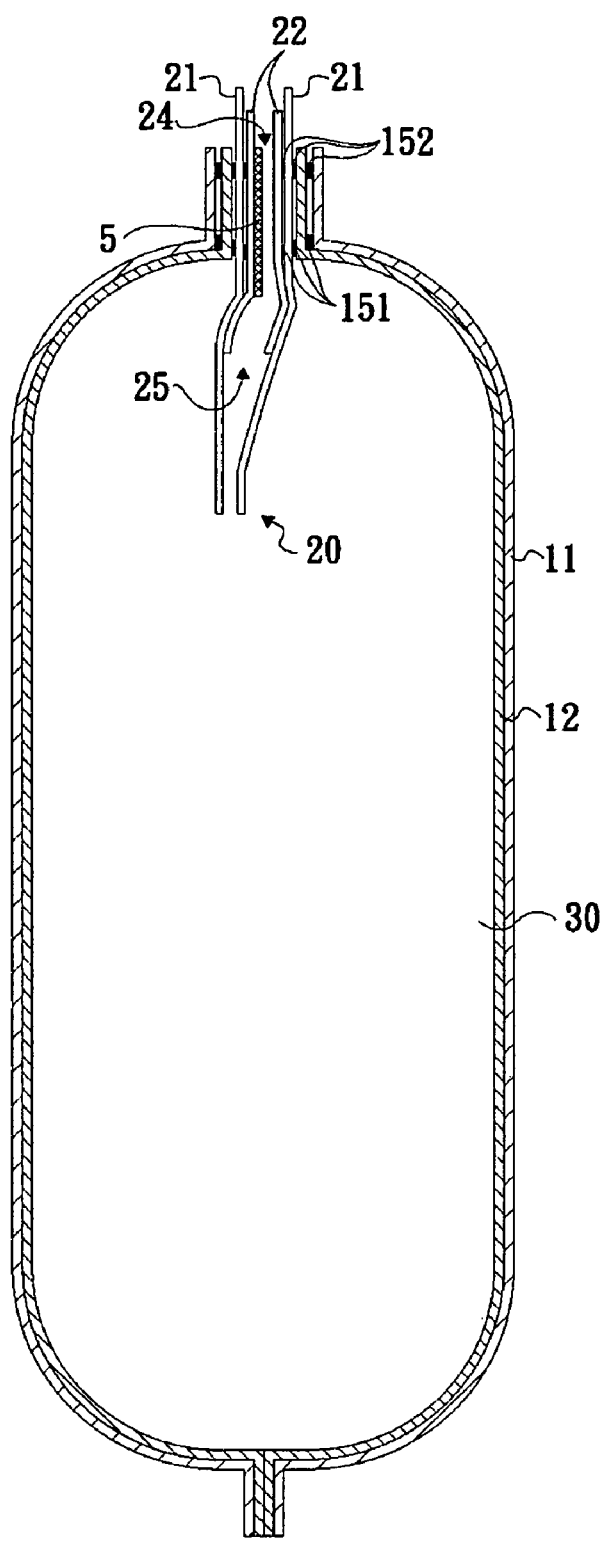
FIG. 3B is a cross sectional view, showing a bendable multistage cushioning cover bag of the first embodiment according to the present invention.

Please refer to FIGS. 1, 2, 3A and 3B. FIG. 1 is a perspective view, showing an outer film of a bendable multistage cushioning cover bag of a first embodiment according to the present invention. FIG. 2 is a schematic view, showing the structure of an outer film of a bendable multistage cushioning cover bag of the first embodiment according to the present invention. FIG. 3A is a plane view, showing a bendable multistage cushioning cover bag of the first embodiment according to the present invention. FIG. 3B is a cross sectional view, showing a bendable multistage cushioning cover bag of the first embodiment according to the present invention.

An air filling bag with an outer film strengthening structure according to the present invention includes an outer film 10 and a main check valve 20.

An air chamber 30 is formed with the two sheets of outer film 10 by adhering sides of the two sheets of outer film 10 to each other by means of hot sealing, where the number of the air chambers 30 may be varied depending on different structure and requirements. In addition, each outer film 10 includes a first film sheet 11 and a second film sheet 12 stacked together, where the first film sheet 11 and the second film sheet 12 may respectively be manufactured from the same material. For example, the first film sheet 11 and the second film sheet 12 are respectively manufactured from Polyethylene (PE), or the first film sheet 11 is manufactured from Polyethylene and the second film sheet 12 is manufactured from Kraft paper. Furthermore, glue is not spread between the first film sheet 11 and the second film sheet 12, so they are not adhered to each other.

In addition, the first film sheet 11 and the second film sheet 12 are adhered to each other by means of hot sealing in a first direction to form a plurality of first hot sealing lines 13, and the first film sheet 11 and the second film sheet 12 are adhered to each other by means of hot sealing in a second direction to form a plurality of second hot sealing lines 14, where the second direction is approximately perpendicular to the first direction in order to allow the first hot sealing lines 13 and the second hot sealing lines 14 to be formed as a beam-to-column connection structure of the outer film 10.

In addition, it is preferable that the first hot sealing line 13 used for adhering the film sheet 11 to the second hot sealing liner 12 be a continuous line, and the second hot sealing line 14 then constituted by a plurality of disconnected hot sealing points 141. However, the present invention is not limited to these.

The main check valve 20 is positioned between the two sheets of outer film 10, one end of the main check valve 20 projects out of the air chamber 30 formed by adhering the two sheets of outer film 10 to each other. Furthermore, the main check valve 20 includes two sheets of first inner film 21 stacked together, and is placed with two sheets of second inner film 22 stacked together between the two sheets of first inner film 21, where one end of the two sheets of the second inner film 22 projects out of the air chamber 30, aligned with one end of the two sheets of first inner film 22 projecting out of the air chamber 30, or a length of one end of the two sheets of second inner film 22 projecting out of the air chamber 30 is shorter than a length of one end of the two sheets of first inner film 21 projecting out of the air chamber 30.

In addition, a heat resistant material 5 is spread between the two sheets of second inner film 22. For example, hot resin or ink is used, and the two sheets of first inner film 21 and the two sheets of second inner film 22 are adhered to each other by a third hot sealing line 151 and a fourth hot sealing line 152 by means of hot sealing. However, the two sheets of second inner film 22 are still not adhered to each other because of the heat resistant material 5 spread between them and a first air inlet 24 is formed. A first air passageway 25 connected with the first air inlet 24 is also formed to use to connect the air chamber 30 with the outside.

When the two sheets of first inner film 21 are pulled apart, the two sheets of inner film 22 are forced through the fourth hot sealing line 152, pulling apart to open the first air inlet 24 and allowing outside air to flow into the air chamber 30 via the first air passageway 25. Thereafter, air in the air chamber 30 compresses the first inner film 21 and the second inner film 22 of the main check valve 20, covering the first air passageway 25 and shielding the air chamber 30, preventing the air in the air chamber 30 from leaking, and achieving an air tight seal.

Furthermore, a top end of the two sheets of first inner film 21 may be longer than the two sheets of second inner film 22 so as to allow a user to pull the two sheets of first inner film 21 apart more easily, without making the mistake of pulling one of the two sheets of first inner film 21 and the adjacent second inner film 22. In addition, the bottom of the two sheets of first inner film 21 may also longer than the two sheets of second inner film 22, so as to allow the bottoms of the two sheets of first inner film 21 to be attached to each other to cover the first air passageway 25, increasing the effectiveness of air sealing when the air in the air chamber 30 compresses the two sheets of first inner film 21.

Figure 4A:
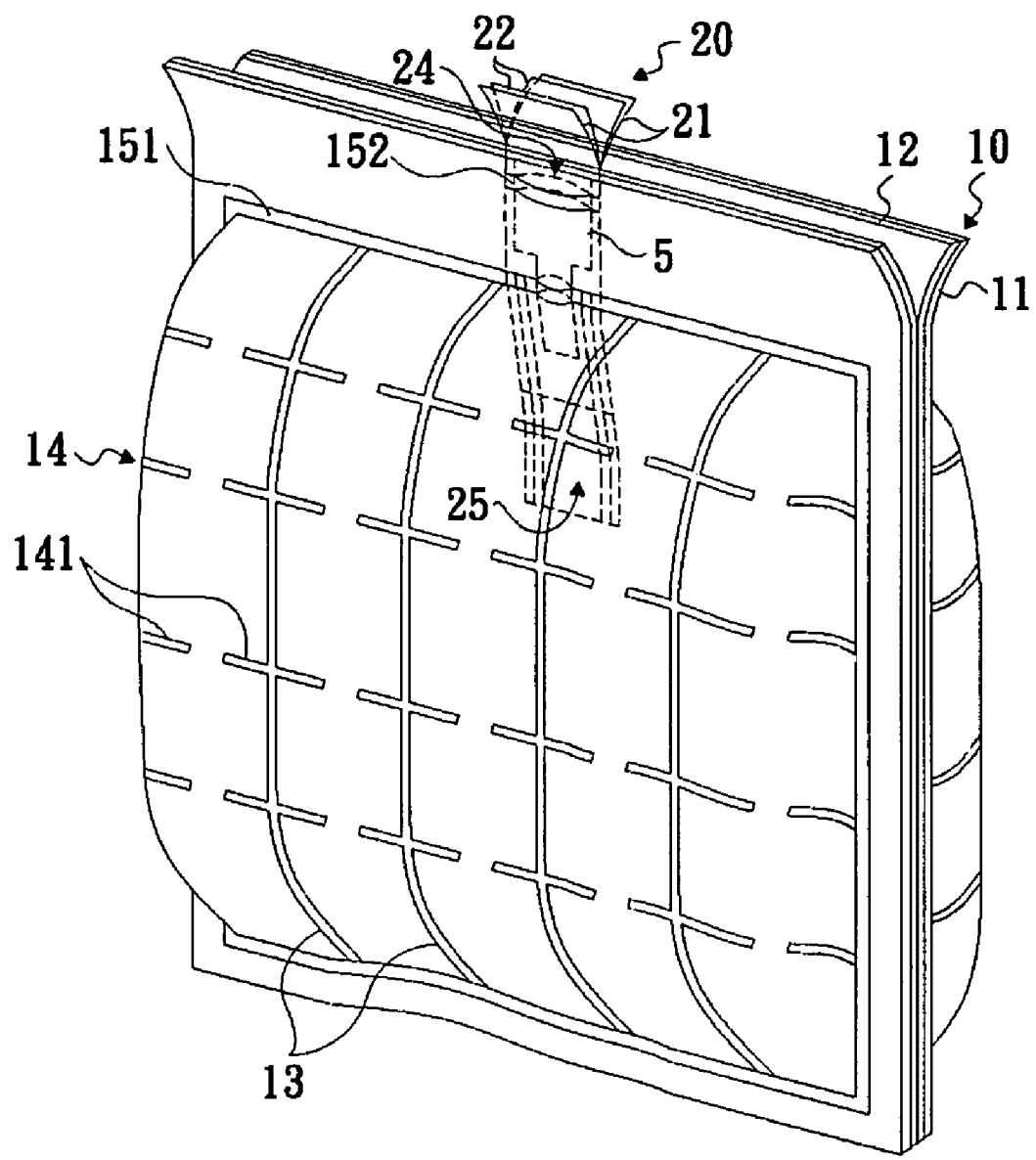
FIG. 4A is a plane view, showing of a bendable multistage cushioning cover bag of a second embodiment according to the present invention.
Figure 4B:
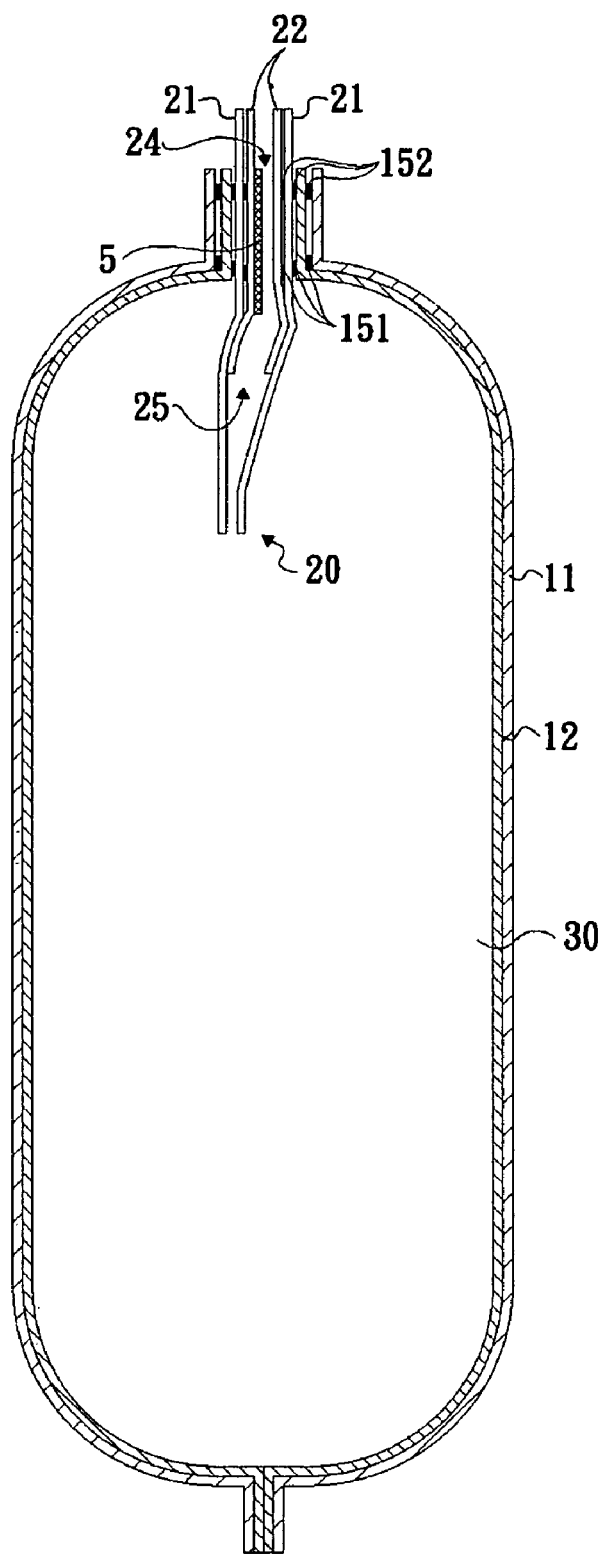
FIG. 4B is a cross sectional view, showing a bendable multistage cushioning cover bag of the second embodiment according to the present invention.

Please refer to FIGS. 4A and 4B. FIG. 4A is a plane view, showing of a bendable multistage cushioning cover bag of a second embodiment according to the present invention. FIG. 4B is a cross sectional view, showing a bendable multistage cushioning cover bag of the second embodiment according to the present invention.

The top ends of the two sheets of the first inner film may be aligned with the top ends of the two sheets of second inner film 22, and the bottom ends of the two sheets of first inner film 21 may then be longer than the two sheets of the second inner film 22. The two sheets of second inner film 22 may be pulled apart through the fourth hot sealing line 152, to open the first air inlet 24 when a user pulls the two sheets of first inner film 21 apart outward. After the bag is filled with air, the bottom ends of the two sheets of first inner film 21 are attached to each other to cover the first air passageway 25, to prevent the air in the air chamber 30 from leaking, and achieving an air tight seal when the air in the air chamber 30 compresses the two sheets of first inner film 21.

Figure 5:
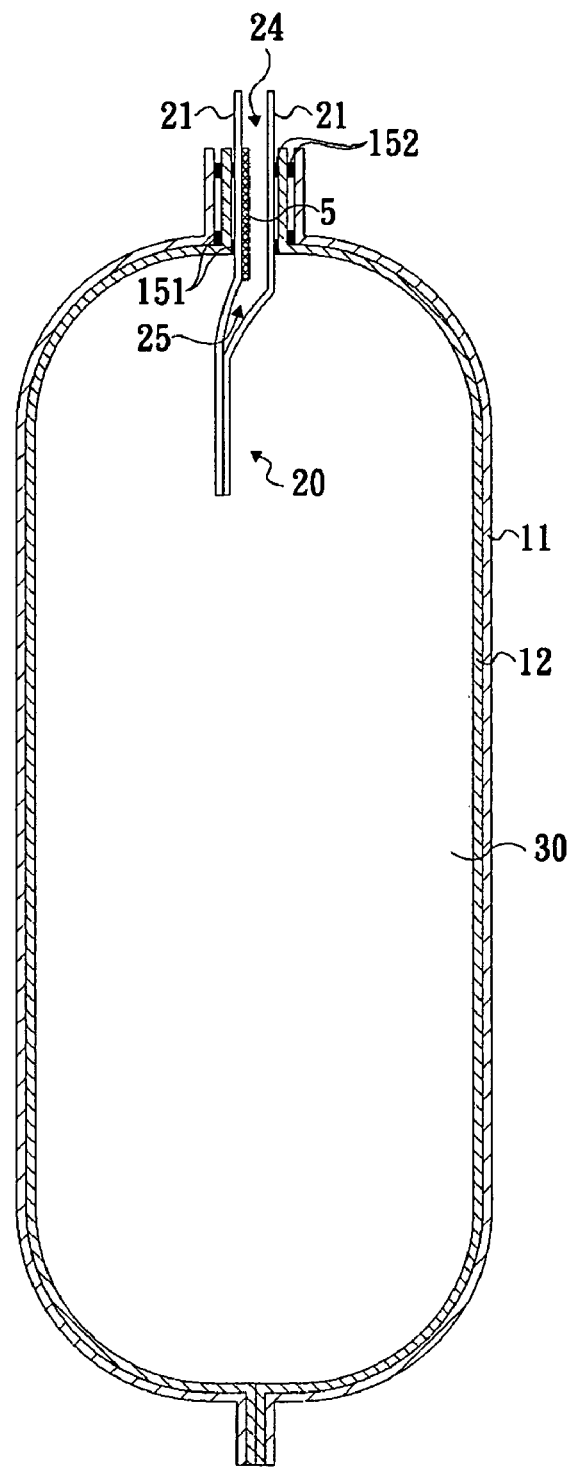
FIG. 5 is a schematic view, showing the structure of a check valve of a bendable multistage cushioning cover bag of a third embodiment according to the present invention.

Please refer to FIG. 5. FIG. 5 is a schematic view, showing a structure of a check valve of a bendable multistage cushioning cover bag of a third embodiment according to the present invention.

The main check valve 20 may also only be placed with two sheets of first inner film 21, where a heat resistant material 5 is spread between the two sheets of first inner film 21. For example, hot resin or ink is used; the two sheets of first inner film 21 are still not adhered to each other to form a first air inlet 24 and a first air passageway 25 even by means of hot sealing to use for connecting the air chamber 30 with the outside.

Figure 6:
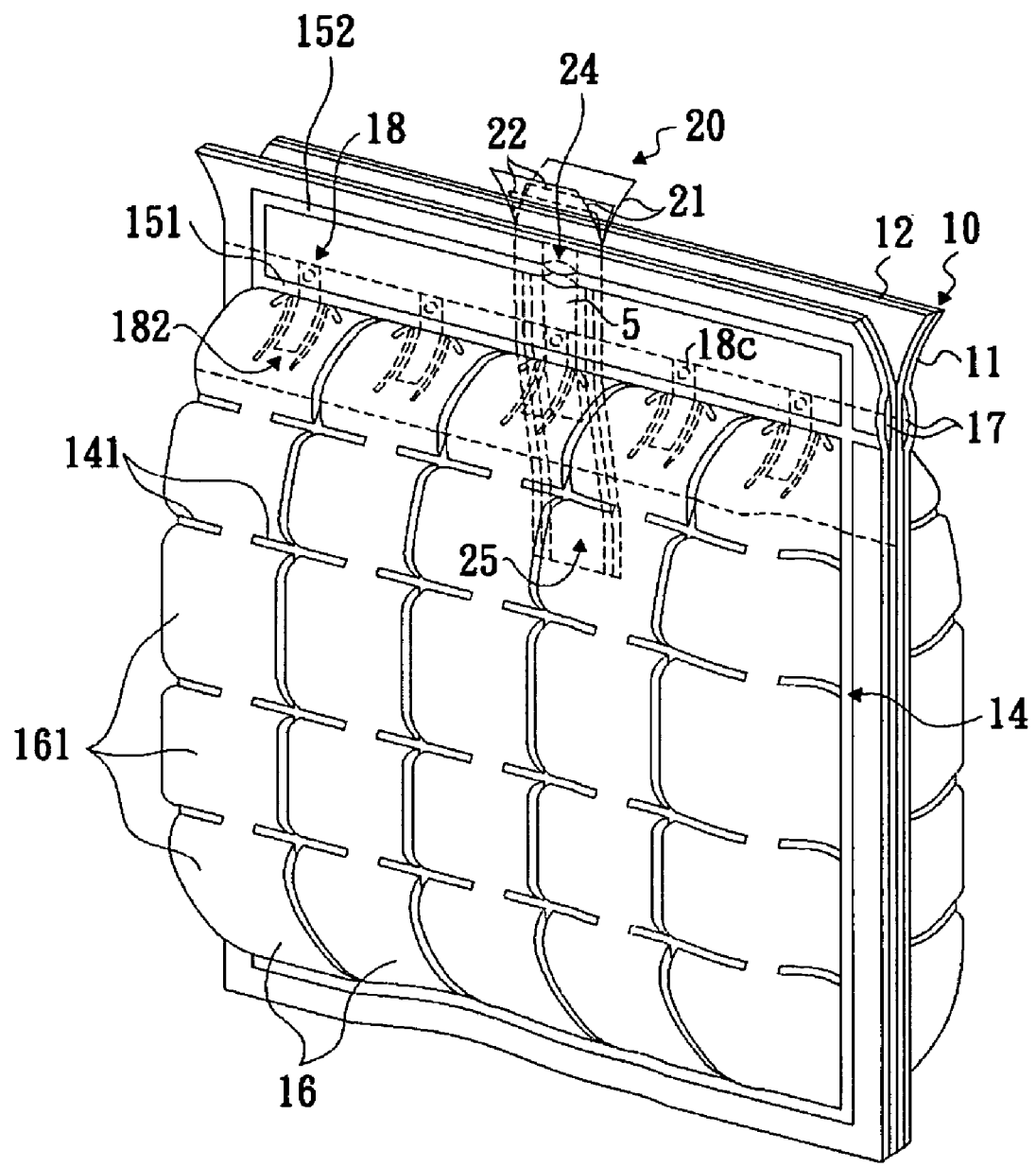
FIG. 6 is a perspective view, showing a bendable multistage cushioning cover bag of a fourth embodiment according to the present invention.
Figure 7:
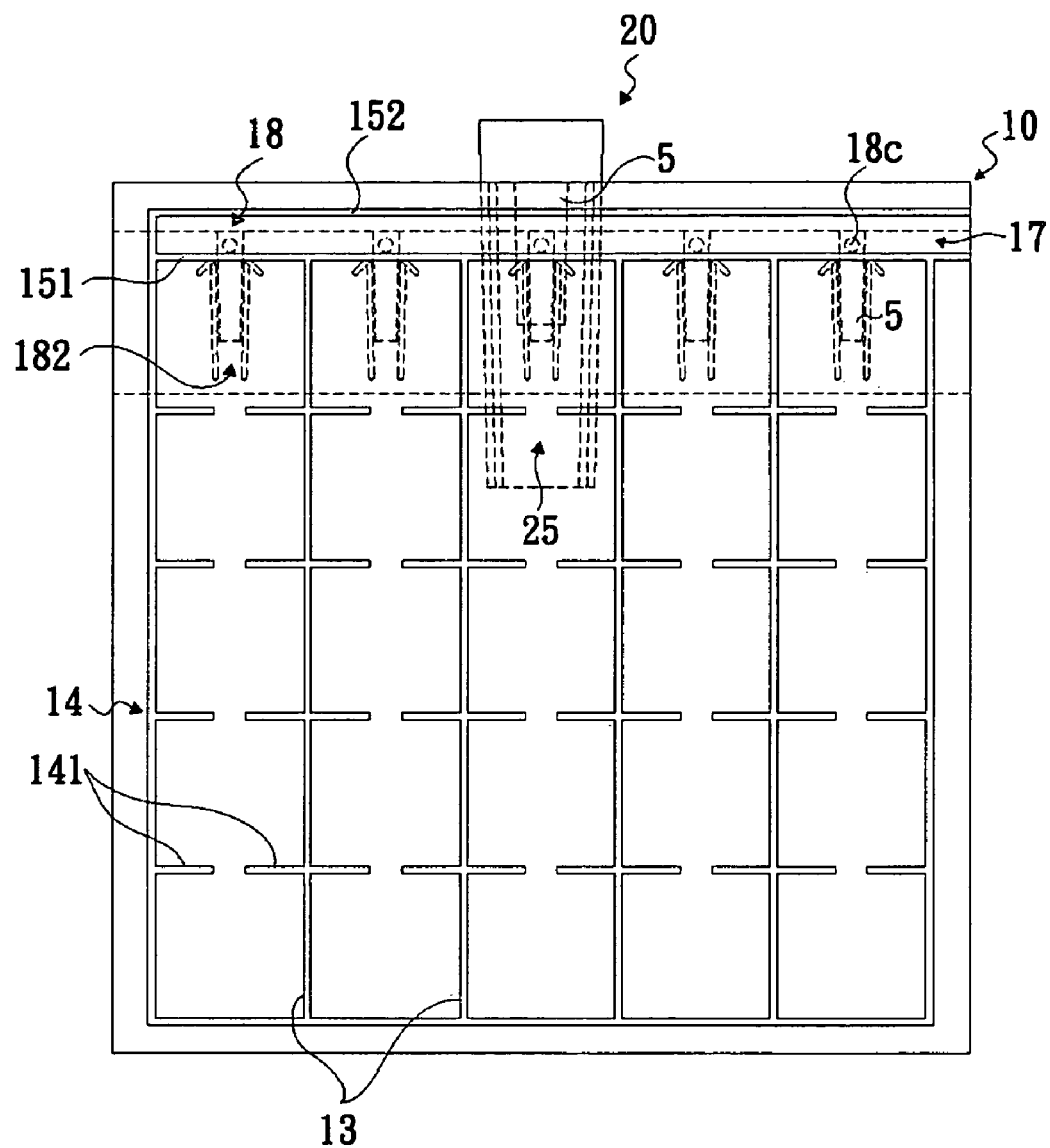
FIG. 7 is a plane view, showing a bendable multistage cushioning cover bag of the fourth embodiment according to the present invention.
Figure 8:
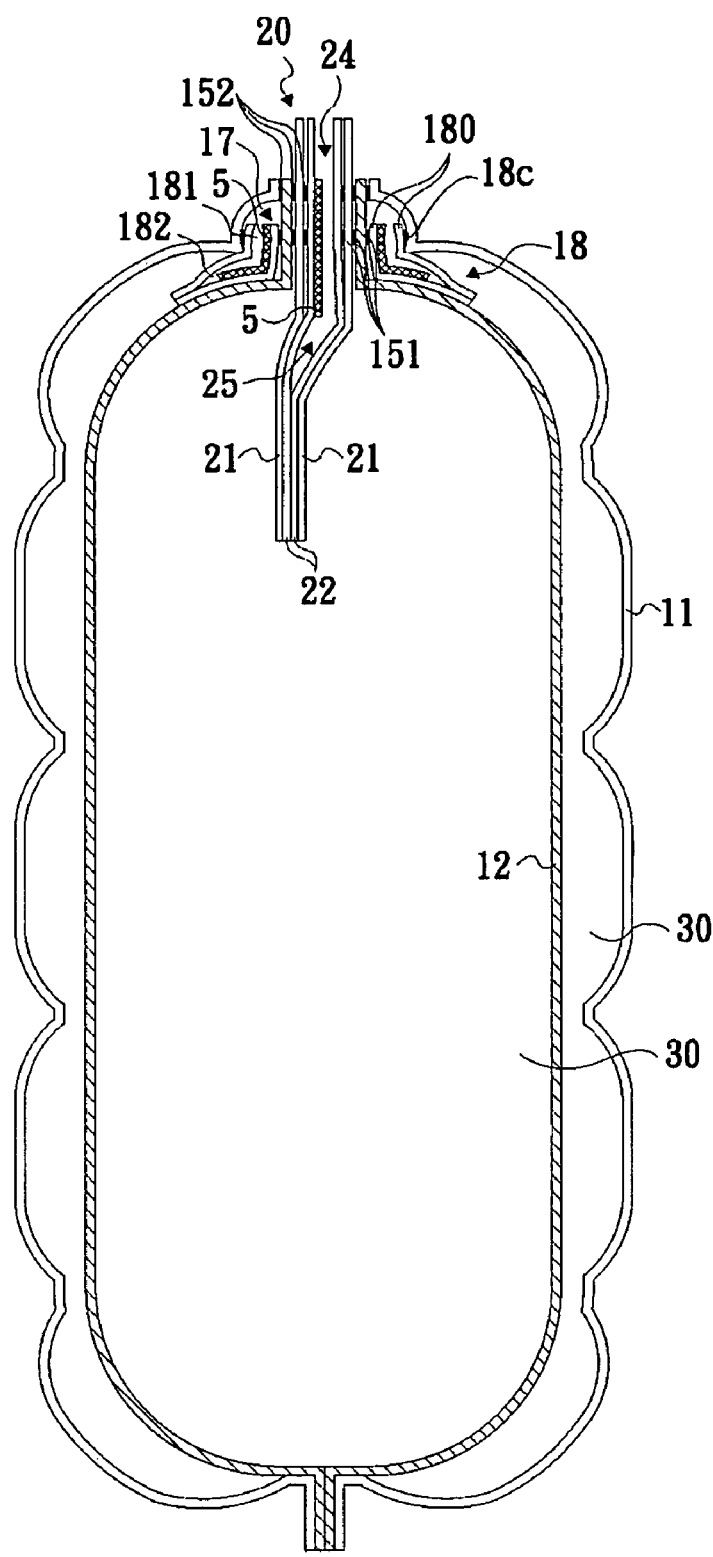
FIG. 8 is a cross sectional view, showing a bendable multistage cushioning cover bag of the fourth embodiment according to the present invention.

Please refer to FIGS. 6, 7 and 8. FIG. 6 is a perspective view, showing a bendable multistage cushioning cover bag of a fourth embodiment according to the present invention. FIG. 7 is a plane view, showing a bendable multistage cushioning cover bag of the fourth embodiment according to the present invention. FIG. 8 is a cross sectional view, showing a bendable multistage cushioning cover bag of the fourth embodiment according to the present invention.

In the present embodiment, a plurality of first hot sealing lines 13 separates a space between the first film sheet 11 and the second film sheet 12 into a plurality of air cylinders 16, and a plurality of hot sealing points 141 of the second hot sealing line 14 separates each air cylinder 16 into a plurality of sections 161, where the plurality of sections 161 of each air cylinder 16 are connected with one another.

An air filling bag with an outer film strengthening structure may further include an air filling passageway 17 and a plurality of auxiliary check valves 18, where the air filling passageway 17 is placed on one end of a plurality of the plurality of air cylinders 16, and it is formed by adhering the first film sheet 11 to the second film sheet 12 by means of hot sealing. The auxiliary check valves 18 are positioned between the first film sheet 11 and the second film sheet 12 and include two sheets of auxiliary inner film 180 stacked together; the two sheets of auxiliary inner film 180 are adhered to each other by means of hot sealing to generate a plurality of hot sealing points 18c, thereby adhering the first film sheet 11 to one sheet of auxiliary inner film 180 and the second film sheet 12 to another sheet of auxiliary inner film 180. A heat resistant material 5 is spread between the two sheets of auxiliary inner film 180. For example, hot resin or ink is used, and the two sheets of auxiliary inner film 180 are still not adhered to each other to form a plurality of second air inlets 181 and a plurality of second air passageways 182 even by means of hot sealing; each second air passageway 182 corresponds to one air cylinder 16, and the plurality of second air inlets 181 and the plurality of second air passageways 182 are used for connecting the air filling passageway 17 with the plurality of air cylinders 16.

After air expands the air filling passageway 17, the first film sheet 11 and the second film sheet 12 are pulled apart to open the second air inlet 181, the air enters each air cylinder 16 via the second air inlet 181 and the second air passageway 182 to cause the plurality of air cylinders 16 to be filled with air and expanded. Thereafter, air in the air cylinder 16 compresses the two sheets of auxiliary inner film 180 of the auxiliary check valve 18 to cover the second air passageway 182, shielding the air cylinder 16 to prevent the air in the air cylinder 16 from leaking, achieving an air tight seal.

When the aforementioned two sheets of auxiliary inner film 180 of the auxiliary check valve 18 are compressed by the air in the air cylinder 16, they can be side-attached to the first film sheet 11 or the second film sheet 12, or may not be side-attached to the first film sheet 11 or the second film sheet 12, but hung in the air cylinder 16.

Figure 9:
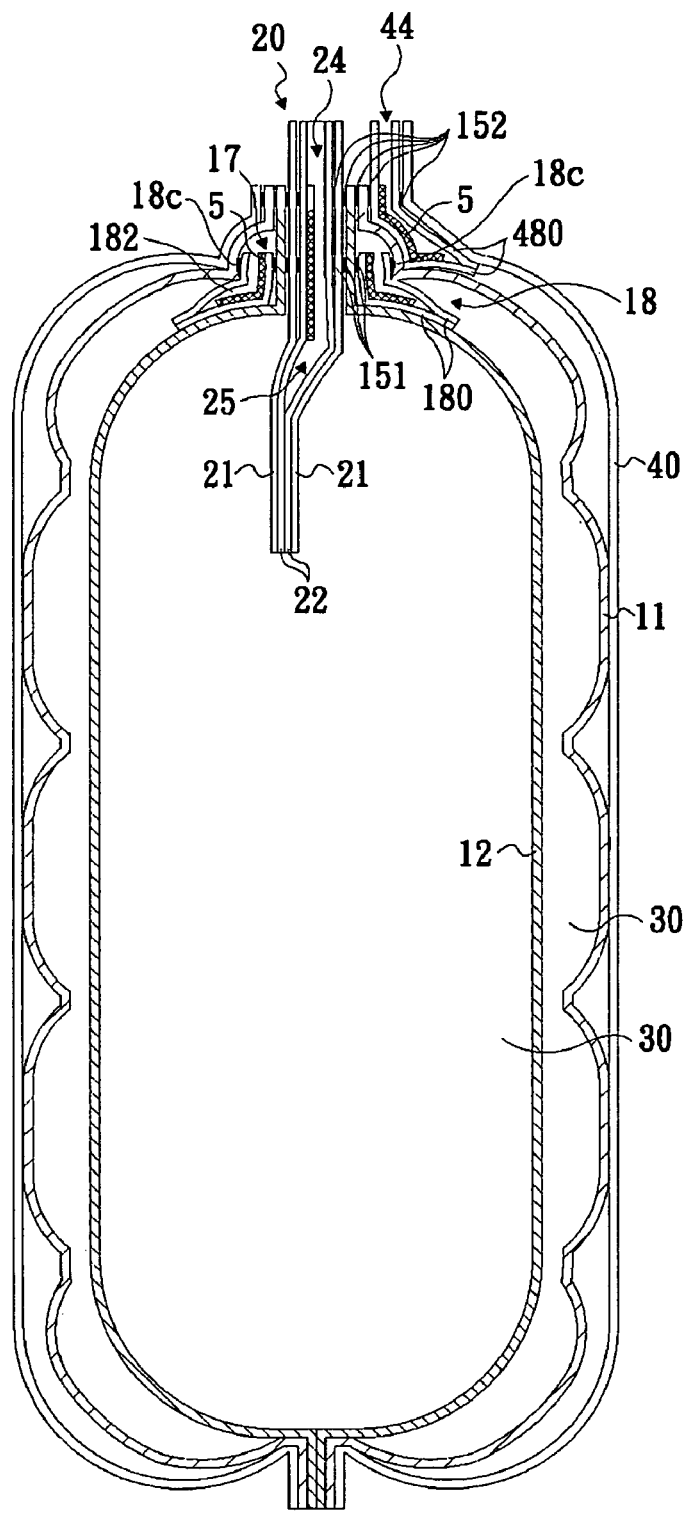
FIG. 9 is a schematic view, showing the structure of a bendable multistage cushioning cover bag of a fifth embodiment according to the present invention.

Please refer to FIG. 9. FIG. 9 is a schematic view, showing a structure of a bendable multistage cushioning cover bag of a fifth embodiment according to the present invention.

In the present embodiment, an air filling bag with an outer film strengthening structure may further include an outer bag 40 positioned outside the two sheets of outer film 10 and used to cover the air chamber 30 formed by adhering the two sheets of outer film 10 to each other by means of hot sealing. The two sheets of outer film 10 can be prevented from being broken by a sharp angle or acute angle of an article in a container by means of the placement of the outer bag 40.

In addition, the outer bag 40 may further be positioned with two sheets of air valve film 480, and a heat resistant material 5 spread between the two sheets of air valve film 480. Part of the two sheets of air valve film 480 spread with the heat resistant material 5 is formed into an air inlet 44 of an outer bag air valve thereby filling the outer bag with air after the two sheets of air valve film 480 are adhered to each other by the third hot sealing line 151 and the fourth hot sealing line 152 by means of hot sealing.

An air filling bag with an outer film strengthening structure according to the present invention uses a first film sheet and a second film sheet independently and not glued to each other, to constitute an outer film and to strengthen the outer film. If one of the first film sheet and the second film sheet is broken, it will not cause the air in the air chamber to leak and the article will still be cushioned effectively. Moreover, the main check allows high pressure air to be filled into the air chamber, causing the air chamber to be filled with air and expanded, and damage of the main check valve will not result from air tight sealing even if the bag is filled with high pressure air.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An air filling bag with an outer film strengthening structure, comprising:
    two outer films, adhered to each other to form an air chamber by means of hot sealing, each outer film including:
        a first film sheet,
        a second film sheet, stacked with the first film sheet,
        a plurality of first hot sealing lines, formed by adhering the first film sheet to the second film sheet by means of hot sealing in a first direction, and
        a plurality of second hot sealing lines, formed by adhering the first film sheet to the second film sheet by means of hot sealing in a second direction approximately perpendicular to the first direction, wherein the first hot sealing lines and the second hot sealing lines are arranged in a grid with respect to each other; and
    a main check valve positioned between the outer films and having one end projecting from the two outer films, the main check valve including:
        two first inner films, stacked together and projecting from the air chamber,
        two second inner films, positioned between the first inner films and projecting from the air chamber, wherein the length of one end of the second inner films is shorter than the length of one end of the first inner films, and
        a first air passageway formed by adhering the first inner films to the second inner films by means of hot sealing and connecting the air chamber with an outside region, the main check valve being compressed by air in the air chamber to shield the first air passageway after outside air flows in the air chamber via the first air passageway.

2. The air filling bag with an outer film strengthening structure according to claim 1, wherein the first film sheet and the second film sheet are made from the same material.

3. The air filling bag with an outer film strengthening structure according to claim 1, wherein the first film sheet and the second film sheet respectively are each made from different materials.

4. The air filling bag with an outer film strengthening structure according to claim 1, wherein the first hot sealing lines are continuous lines.

5. The air filling bag with an outer film strengthening structure according to claim 4, wherein the first hot sealing line divides a space between the first film sheet and the second film sheet into a plurality of air cylinders.

6. The air filling bag with an outer film strengthening structure according to claim 5, wherein the second hot sealing line comprises a plurality of hot sealing points and separates each air cylinder into a plurality of sections, and the sections of each air cylinder are connected with one another.

7. The air filling bag with an outer film strengthening structure according to claim 6, further comprising an air filling passageway positioned at one end of the air cylinders.

8. The air filling bag with an outer film strengthening structure according to claim 7, further comprising an auxiliary check valve positioned between the first film sheet and the second film sheet, the auxiliary check valve comprising a plurality of second air passageways, each second air passageway corresponding to one air cylinder, air in the air filling passageway flowing into the air cylinders via the second air passageways, and the air cylinders compressing the auxiliary check valve to shield the second air passageways.

9. The air filling bag with an outer film strengthening structure according to claim 1, further comprising an outer bag, positioned outside the outer films and covering the outer films.

10. The air filling bag with an outer film strengthening structure according to claim 1, wherein the first hot sealing lines and the second hot sealing lines are arranged in a grid with respect to each other.

* * * * *